Nov. 17, 1964
H. T. HENDERSON
3,157,851
TIRE PRESSURE WARNING DEVICE
Filed May 16, 1961
2 Sheets-Sheet 1
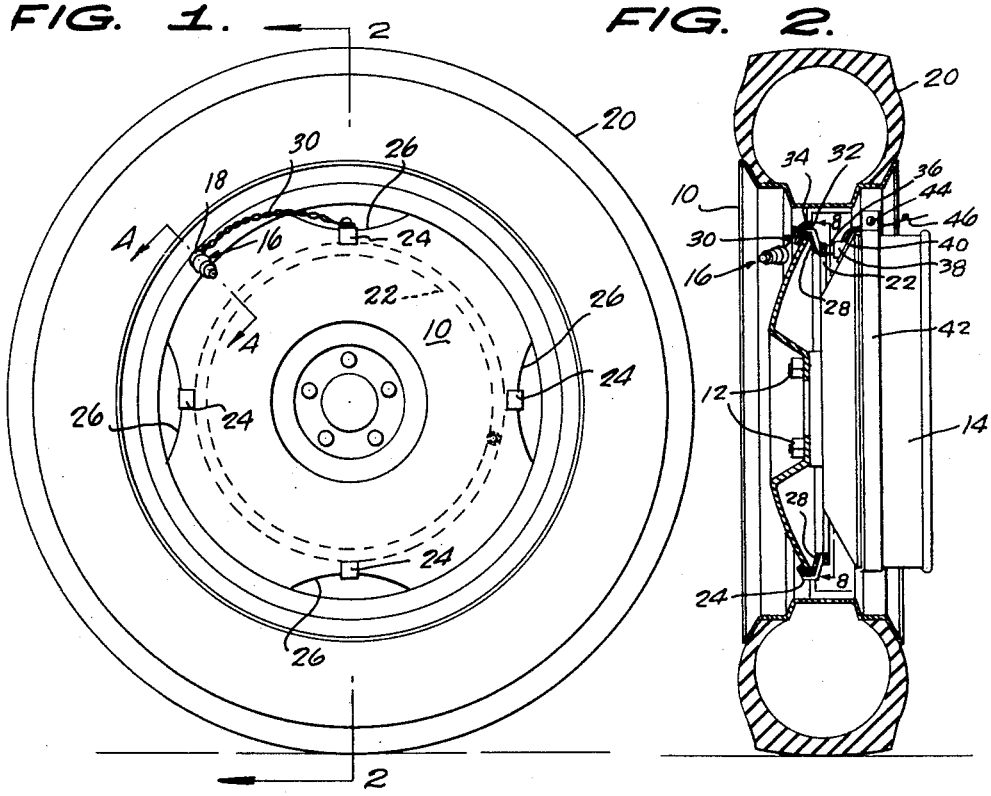
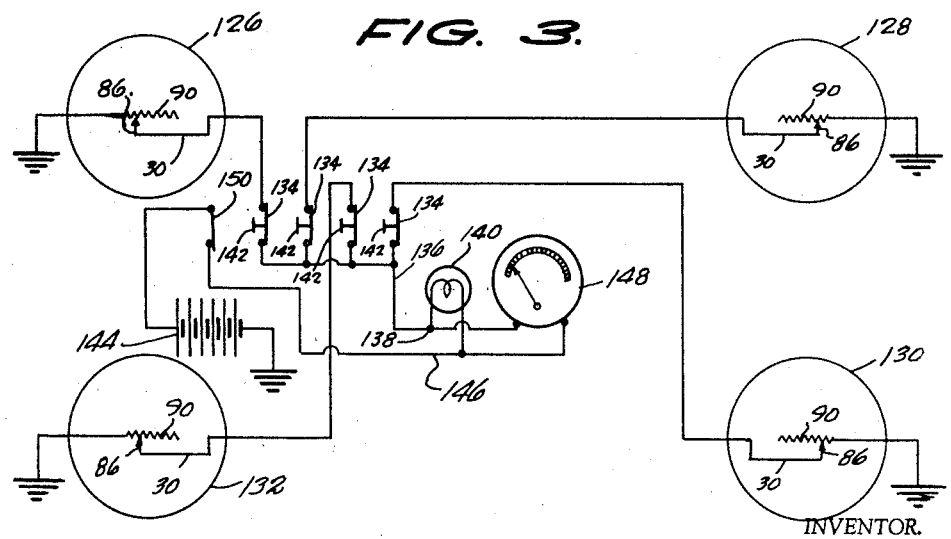
INVENTOR.
HILLIARD T. HENDERSON,
BY
McMorrow, Berman & Davidson
ATTORNEYS.

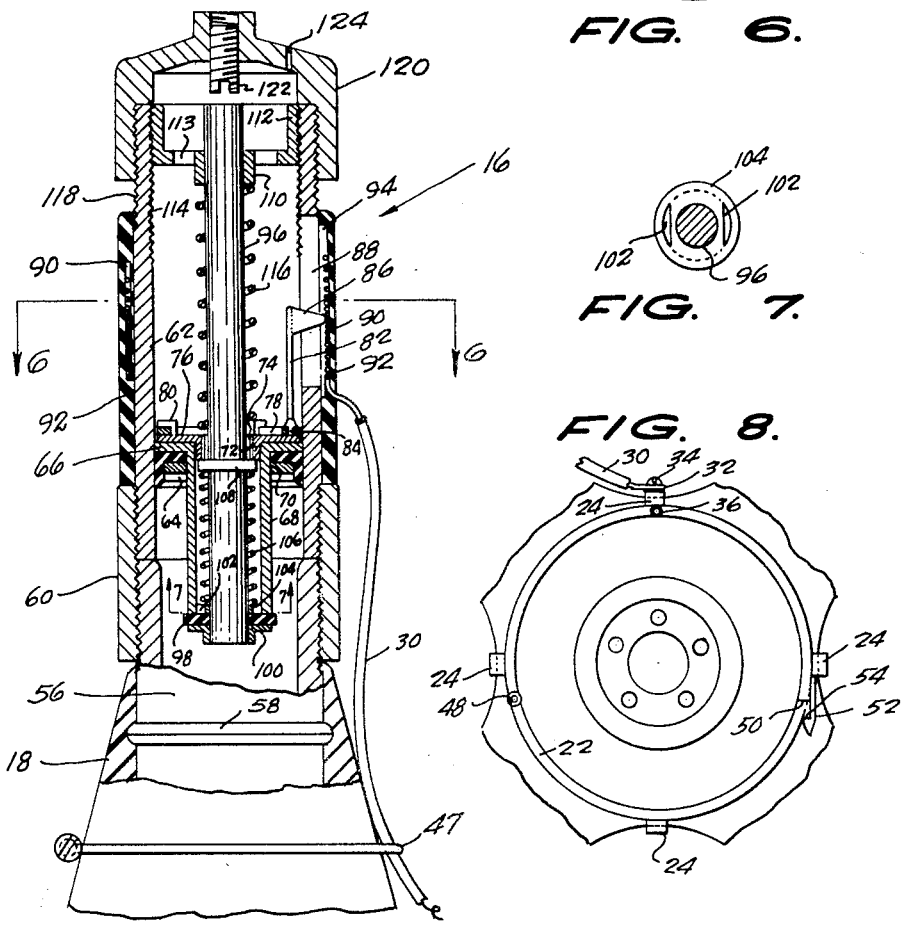

United States Patent Office 3,157,851
Patented Nov. 17, 1964

3,157,851
TIRE PRESSURE WARNING DEVICE
Hilliard T. Henderson, 5368 Springhill Drive,
Pensacola, Fla.
Filed May 16, 1961, Ser. No. 110,363
8 Claims. (Cl. 338—37)

This invention relates to a device for indicating pressure conditions in pneumatic tires. While some blowouts occur suddenly in a fully inflated tire, for various reasons, yet many are due to faults which are progressively aggravated by flexing and overheating during a period of gradual loss of pressure in the tire. It becomes important, therefore, to detect such loss at an early stage. The problem itself has been fully recognized heretofore, and proposed solutions have been advanced. For the most part, these have been concerned with arrangements of a type wherein mechanical "feelers" have been employed to detect lowering of the height of the vehicle chassis above the roadway, due to softening of the tire, and to communicate a signal when such lowering reached a predetermined, critical level. Such systems have inherent weaknesses, such as their exposure to accidental contacts and shock damage, and in general are not capable of constant, reliable performance. However, I have found that by locating the detector bodily within the pressurized system itself, all such shortcomings are obviated.

It is therefore a general object of the invention to provide a warning system for tire pressures having greatly improved fidelity of operation. More particularly, it is an object to provide a pressure detector adapted to be lodged within the pressurized system itself. An additional object related to the foregoing is to provide a pressure warning device which is isolated within a protective mounting. A further object is to achieve the foregoing by a system in which the critical parts are associated with a tire valve stem, and also to accomplish this with a mechanical arrangement which incorporates the functions of the conventional valve core.

These and other ends, which will be apparent to those skilled in the art, in the light of this disclosure, are attained by the present invention, a preferred form of which is described in the following specification, as illustrated in the drawings, in which:

FIGURE 1 is a side elevation view of a vehicle wheel with pneumatic tire, incorporating the pressure warning device.

FIGURE 2 is a diametral, sectional view of the wheel, taken on the line 2—2 of FIGURE 1.

FIGURE 3 is a schematic wiring diagram of the warning system, as applied to the four wheels of a vehicle.

FIGURE 4 is an axial, sectional view of the pressure detector, as mounted on the tire valve stem, the view being taken along the line 4—4 of FIGURE 1.

FIGURE 5 is a top plan view of the device shown in FIGURE 4, with the dust cap removed to show interior details.

FIGURE 6 is a sectional view taken along the line 6—6 of FIGURE 4.

FIGURE 7 is a sectional view of an interior detail, taken along the line 7—7 of FIGURE 4.

FIGURE 8 is a view of a detail, showing the slip ring and its mounting on the wheel, as taken along the line 8—8 of FIGURE 2.

Referring to the drawings by characters of reference, and considering first the over-all system, there is shown, in FIGURES 1 and 2, a vehicle wheel 10, mounted by bolts 12 on a drum 14 carried by the vehicle axle. The pressure responsive unit for signalling pressure conditions, indicated as a whole by the numeral 16, is mounted on the conventional valve stem 18, which, in the case shown, is of the flexible tube type, mounted in the wheel 10 and communicating with the interior of the tubeless tire 20.

A slip ring, or collector ring, 22, is mounted on the inside of wheel 10, concentrically therewith, by means of four clips 24, welded to the ring, and engaged over the arcuate edges 26 of windows in the wheel, the clips being insulated from the wheel by strips 28 of electrically insulating material. The purpose of the collector ring is to provide continued electrical contact between an indicator in the vehicle, and the pressure-sensing unit 16 carried by the wheel, the arrangement being such that subnormal pressures cause the closing of a switch which completes the circuit between the indicator or signal device, and ground. Thus, a lead 30 from the pressure sensor 16 is connected to the slip ring 22 through a terminal 32, secured by a screw 34, and continuous contact between the slip ring and the vehicle is accomplished through a brush 36 slidably mounted in a tube 38 against spring pressure, in the conventional manner, the tube being carried by a tongue 40 of a split ring 42 of insulating material, which is clamped on the periphery of drum 14 by a bolt 44. A conductor wire 46 connected to the brush system, leads to the indicator, or signal means, in the vehicle, and this wire will be suitably attached or anchored to the vehicle chassis or body at spaced points. The lead 30 is held down by a split clamp 47 surrounding stem 18.

For easy mounting without the need for removing a wheel, the slip ring is preferably made in split form, as shown in FIGURE 8, with two complementary, annular segments pivoted together at one end by a pin 48, with the two free ends meeting at a line 50 to form the complete annulus, and the ring being maintained in closed form by a hook-form spring finger 52 on one segment engaging behind a barb 54 on the other segment.

The pressure sensing unit is shown in detail in FIGURES 4 and 6. In FIGURE 4, the tubular insert 56, anchored by rib 58 in valve stem 18, is conventional, as is also the outer sleeve 60 threaded therein, the latter being adapted to threadedly receive a conventional valve core. In lieu of the latter, the sleeve 60 threadedly receives the lower end of a tube 62, which forms the main housing of the combined pressure-sensing means and valve core. Functionally, the tube 62 is a pneumatic cylinder, in which is slidably mounted a piston of composite construction, the essential, wall sealing element of which is an inverted cup 64 of leather or rubbery material, with its outer, flat face contacting the under face of an end flange 66 of a tube 68 and retained in such position by a washer 70, which may be secured in any suitable manner to tube 68, or retained in a force fit. A short tube 72, snugly received in the top of tube 68, has a series of four, internal grooves 74, to facilitate air passage, and has a top flange 76, generally coextensive with flange 66, to which it is secured as by staking, brazing, or other suitable means. An annular ring 78 of diameter comparable to that of cylinder 62, dwells on flange 76, being secured thereto by bent tabs 80, carried by flange 76, which permit relative rotation between the ring and the flange. The ring 78 carries an upright rod 82, secured to the ring as by a rivet 84, and the rod, at its upper end, carries an arm 86 which protrudes through, and is slidable along a longitudinal slot 88 in the cylinder 62, and constitutes a sliding electrical contactor for a helical rheostat. The latter, indicated by the numeral 90 is embedded in a sleeve 92 of suitable insulating material, which is of sufficient resilience to constitute an air-sealing gasket at its line of contact with the top of sleeve 60. Internally the insulator sleeve is provided with a slot 94 which exposes the rheostat windings for contact by the slider arm 86.

The main valve for retaining pressure in the tire is generally similar to the customary valve, being carried on a central rod 96, which is slidable axially of the valve stem or valve housing, but in the present case this sliding action is with respect to the tube 68, and the latter carries the inner rod 96 along with it, as it slides along tube 62 in response to pressure changes within the tire. For pressure-sealing action, the central rod 96 carries, near its lower end, a resilient washer gasket 98, which is held on the rod by a flanged nipple 100, secured to the rod at its lower end. Washer 98 is of a size to cover a series of air passage openings 102 in an annular flange, or bottom wall 104 on tube 68, in which rod 96 is slidably mounted, and the valve is normally kept closed by a compression coil spring 106, acting between the said bottom wall and an integral, annular flange or collar 108 on rod 96 and loosely fitting in tube 68. Near its upper end, the valve rod 96 is also slidably received in the central, tubular portion 110 of a nipple 112 having windows 113, and which is threadedly received in interior threads 114 of tube 62. The nipple performs the dual function of guiding the rod 96 and of adjusting the value of the pressure at which the signal operates. For the latter purpose, the entire piston system carrying the sealing cup 64 is biased inwardly of the valve housing, against the internal pressure of the tire, by a compression coil spring 116, acting between the tube 110 of the nipple 112, and the flange 76 on top of the piston unit. The valve housing tube 62 is threaded externally, at its upper end, as at 118 to receive a dust cap 120.

At no pressure, or low pressures, the piston will be urged inwardly by spring 116, contact slider will be in contact with some portion of the rheostat 90, and this portion of the circuit, leading from the indicator in the vehicle to ground is closed. With dust cap 120 removed, a nozzle from a pressure line is placed over the top opening of tube 62, and air is caused to flow into the tire, through windows 113 in the nipple, grooves 74 in the tube 72, around collar 108, and finally through windows 102 in the bottom 104, to contact sealing washer 98, the latter being forced away from its seat, against the pressure of spring 106, by the applied pressure. When the external pressure source is disconnected, the sealing washer 98 springs back onto its seat, due to the internal pressure, as well as the action of spring 106. During inflation of the tire, the piston carrying sealing cup 64 gradually moves outward, against the pressure of spring 116, and when the proper pressure is reached, as predetermined by the load on spring 116 as adjusted by positioning nipple 112 in its thread mounting, the slider 86 will have moved off of the rheostat, thus breaking the ground portion of the signal circuit.

In order to guard against excess pressures in the tire, the piston system is also utilized by means of a set screw 122 threaded in a central opening in the cap 120, and thus adjustably positionable inside the cap to intercept movement of the central rod 96 of the valve, at a predetermined position thereof, so as to unseat the sealing ring 98 and permit escape of air until maximum permissible pressure is restored. For this purpose the cap 120 is provided with a vent 124.

The complete signal system is shown schematically in the circuit diagram in FIGURE 3. In this layout the large circles 126, 128, 130, 132, at the four corners of the diagram, represent the tire valve housings at the four wheels of the vehicle. Since these are identical in structure and electrical hook-up, only one need be described, with similar reference numerals applied to each of the four. The rheostat and its leads are numbered as above, with the rheostat indicated at 90, the sliding contact 86, and the lead 30 to the signalling device. The collector ring is not shown, since the system is operable whether the wheels are turning or at rest. Each conductor 30 leads to one of four switches 134, leading to a common line 136 to the ground terminal 138 of a signalling light bulb 140. Switches 134 are normally closed, and are openable through pressure on push buttons 142. The lamp circuit is completed to the hot side of the battery 144 through a conductor 146. Lamp 140 is qualitative in function, since its function is to indicate whether pressure is normal or sub-normal. The actual value of the pressure, when in the sub-normal range is indicated by a suitable instrument, such as a proper ammeter 148, in parallel with lamp 140, across leads 136, 146. The entire signal circuit may be placed in inoperative condition, as for instance during periods of non-use of the vehicle, by means of a main switch 150 in the main line between the signals and the battery. Conveniently, this function could be performed by the usual ignition switch.

In operation, assuming all four tires properly inflated, if for any reason the pressure in any one drops below the minimum value, as predetermined by the pressure of spring 116, set by nipple 112, all four switches 134 being closed, the valve system in the tire with the sub-normal pressure will complete the circuit from lamp 140 to ground, and the lamp will glow, to announce the defective pressure condition. At the same time, the ammeter 148 will register. With the arrangement shown, the full resistance of the rheostat is thrown in at the inception of the signalling, and gradually diminishes as the pressure decreases. In this case, the readings on the ammeter vary inversely with the drop in pressure. However, if the lead 30 were attached at the upper end of the rheostat, the ammeter readings would commence at maximum value, and fall off in direct relation to the fall in pressure.

In order to determine which tire has the low pressure, it is only necessary to press the buttons 142 in succession until the light is extinguished, the switches being appropriately labeled to identify the wheel with which each is associated. In the unusual event that two or more tires should signal a defect simultaneously, they can be easily spotted by opening all four switches, and then closing them each singly, in succession.

I claim:

1. A warning device, responsive to tire pressures comprising a tubular housing adapted for mounting on a tire valve stem, an air-sealing piston slidably mounted in said tube, a rheostat carried by said housing and electrically insulated therefrom, a sliding contact adapted to engage said rheostat carried by said piston and grounded through said housing, said piston having a tubular, depending portion having a bottom with air passages and a central opening, a rod mounted for sliding movement axially of said opening, and having a radially extending collar medially of its length, a seat at one end of said rod below said bottom, and having a resilient washer to seal said air passages, a spring surrounding said rod, and acting between said bottom and said collar to retain said washer against said passages, a spring surrounding said rod above said piston, an abutment for the upper end of said latter spring comprising a nipple threadedly carried in said housing for adjustable positioning axially of said housing, and said nipple having air passages, a vented cap on said housing, and a threadedly adjustable abutment carried by said cap and positioned for contact by said rod during axial movement of said rod.

2. A device as in claim 1, said sliding contact being attached to a ring-shaped member, and said member being secured to said piston by bent tabs carried by the piston.

3. A device as in claim 1, said tubular depending portion having an upper flange, an annular cup of resilient material surrounding said portion beneath said flange, and snugly fitted within said housing, and a retaining washer surrounding said portion, on the lower hollow side of said cup.

4. A warning device, responsive to tire pressures, comprising a tubular housing adapted for mounting on a tire valve stem, an air-sealing piston slidably mounted in said tube, a variable resistor carried by said housing, a slide terminal carried by said piston and contacting said resistor, said piston having a tubular, depending portion having a bottom with air passages, and a central opening, a rod mounted for sliding movement axially of said opening, a protruding stop means medially of the length of said tube, a seating flange at one end of said rod, below said bottom, and carrying a resilient washer to seal said said air passages, a spring surrounding said rod, and acting between said flange and said stop means, to retain said washer against said passages, a spring surrounding said rod above said piston, an abutment for the upper end of said latter spring comprising a nipple threadedly carried in said housing for adjustable positioning axially of said housing, and said nipple having air passages, a vented cap on said housing, and a threadedly adjustable abutment carried by said cap, and positioned for contact by said rod during axial movement of said rod.

5. A warning device, responsive to tire pressures, comprising a tubular housing adapted for mounting on a tire valve stem, an air-sealing piston slidably mounted in said tube, a variable resistor carried by said housing, a slide terminal carried by said piston and contacting said resistor, said piston having a tubular, depending portion having a bottom with air passages, and a central opening, a rod mounted for sliding movement axially of said opening, a protruding stop means medially of the length of said tube, a seating flange at one end of said rod, below said bottom, and carrying a resilient washer to seal said air passages, a spring surrounding said rod, and acting between said flange and said stop means, to retain said washer against said passages, a spring surrounding said rod above said piston, and an abutment for the upper end of said latter spring, comprising a nipple threadedly carried in said housing for adjustable positioning axially of said housing, said nipple having air passages.

6. A warning device, responsive to tire pressures, comprising a tubular housing adapted for mounting on a tire valve stem, an air-sealing piston slidably mounted in said tube, a variable resistor carried by said housing, a slide terminal carried by said piston and contacting said resistor, said piston having air passages and a central opening, a rod mounted for sliding movement through said opening and carrying a sealing means for said air passages, a first spring means associated with said rod biasing said sealing means into closing position under said passages, and a second spring means biasing said piston against the internal pressure under the piston, and means to adjust the pressure of said second spring means.

7. A warning device, responsive to tire pressures, comprising a tubular housing adapted for mounting on a tire valve stem, an air-sealing piston slidably mounted in said tube, a first electric contact carried by said housing, a second electric contact carried by said piston and adapted to engage said first contact in response to movement of said piston along said tube, said piston having air passages and a central opening, a rod mounted for sliding movement through said opening, and carrying a sealing means for said air passages, a first spring means associated with said rod biasing said sealing means into closing position under said passages, and a second spring means biasing said piston against the internal pressure under the piston, and means to adjust the pressure of said second spring means.

8. A warning device, responsive to tire pressures, comprising a tubular housing adapted for mounting on a tire valve stem, an air-sealing piston slidably mounted in said tube, a first electric contact carried by said housing, a second electric contact carried by said piston and adapted to engage said first contact in response to movement of said piston along said tube, said piston having air passages and a central opening, a rod mounted for sliding movement through said opening, and carrying a sealing means for said air passages, a first spring means associated with said rod biasing said sealing means into closing position under said passenges, and a second spring means biasing said piston against the internal pressure under the piston.

References Cited in the file of this patent
UNITED STATES PATENTS

| | | |
|---|---|---|
| 1,581,320 | Pumphey | Apr. 20, 1926 |
| 1,811,769 | Weaver | June 23, 1931 |
| 2,248,047 | Addy et al. | July 8, 1941 |
| 2,510,785 | Potts et al. | June 6, 1950 |
| 2,621,274 | Maddox | Dec. 9, 1952 |
| 2,669,876 | Lentz | Feb. 23, 1954 |